Aug. 29, 1967   J. J. MILLER   3,338,201
PRESSURE VESSEL
Filed June 30, 1965   4 Sheets-Sheet 2

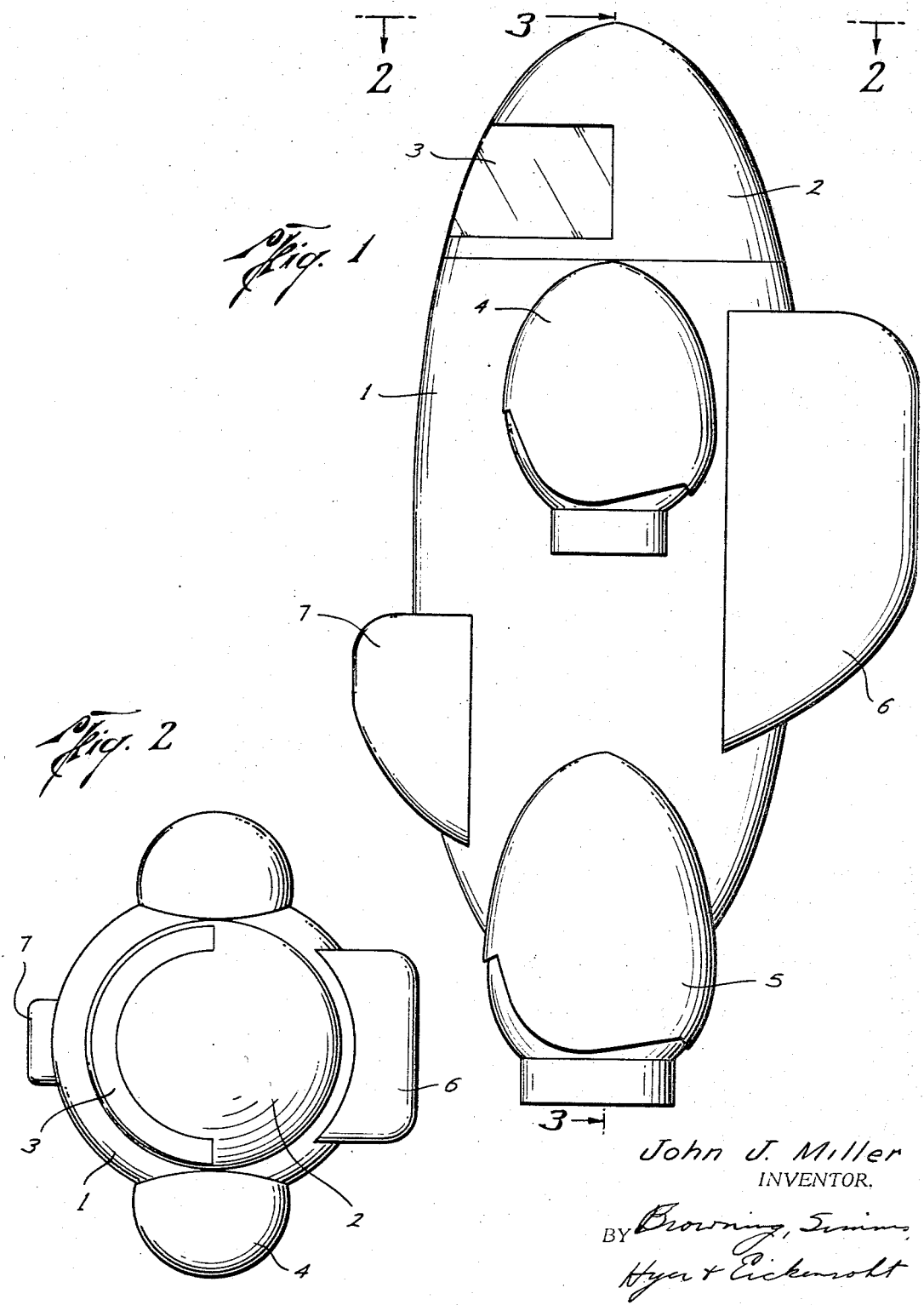

John J. Miller
INVENTOR.

BY Browning, Simms
Hyer & Eickenroht
ATTORNEYS

John J. Miller
INVENTOR.
BY Browning, Simms, Hyer & Eickenroht
ATTORNEYS

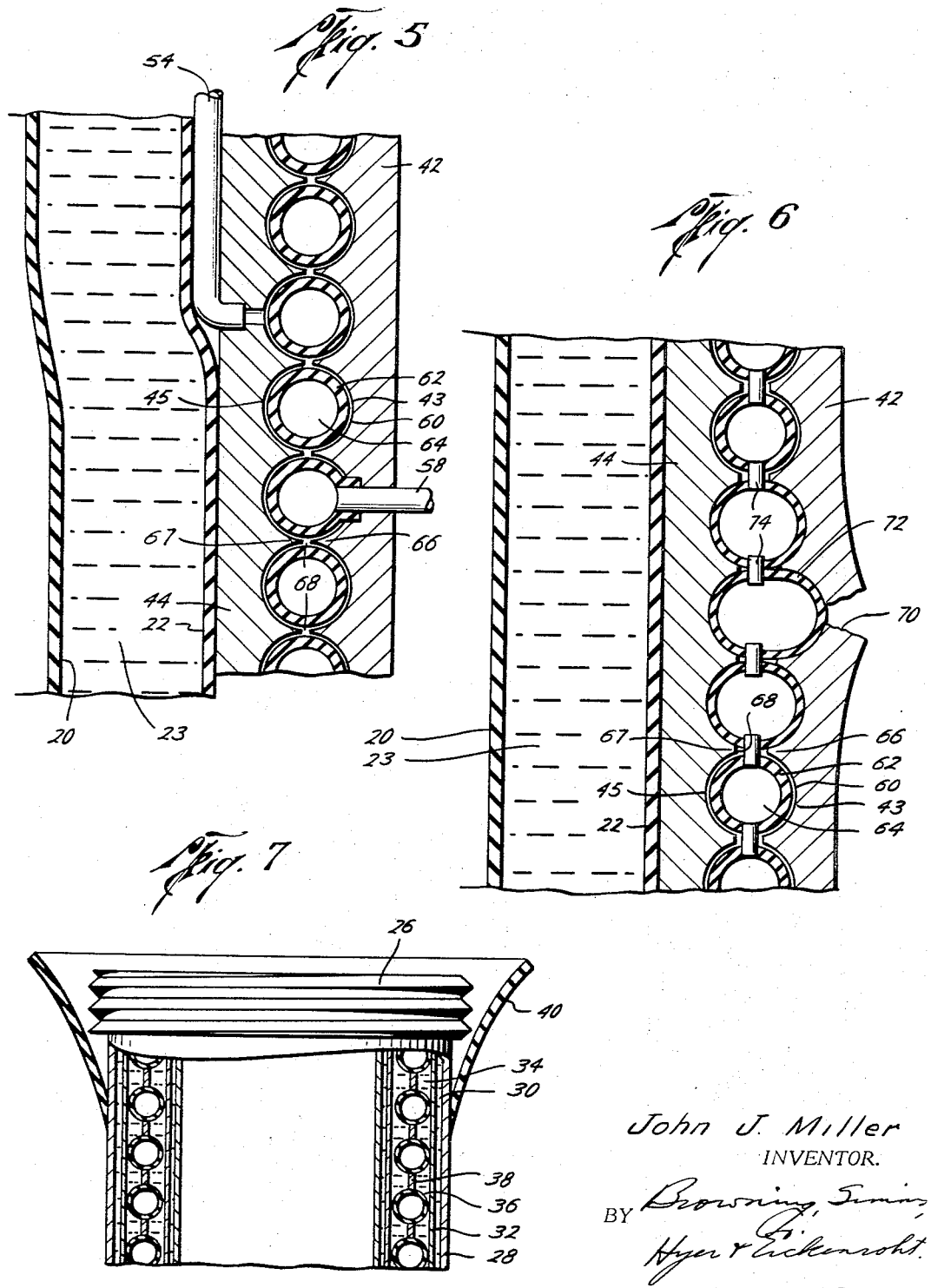

United States Patent Office 3,338,201
Patented Aug. 29, 1967

3,338,201
PRESSURE VESSEL
John J. Miller, Houston, Tex., assignor to Mila-Ben International, Inc., Houston, Tex., a corporation of Texas
Filed June 30, 1965, Ser. No. 468,378
15 Claims. (Cl. 114—16)

This invention relates to a structure for a vessel intended for use in which its interior and exterior surfaces may be subjected to substantial differentials of pressure or temperature or both, and to considerable changes in such differentials during use. One use for such a vessel is as a diving suit for a diver descending to considerable depths beneath the surface of water, or for other use as a vessel in which it is desirable that the interior thereof be maintained at a much lesser pressure or higher temperature or both than the pressure, temperature and the like prevailing on the outside thereof.

In building vessels for greater and greater depths of service in the past it has been the practice in order to make such vessels capable of withstanding the higher pressure differentials between the exterior and interior thereof at great depths, to make the walls thereof of extremely strong heavy material and to increase their thickness to take care of the ever increasing stresses to which they are subjected at increasing depths of service.

However, another factor which becomes of very great importance at greater depths within natural bodies of water is that of the increasing temperature differentials between the exterior and interior of such a vessel, assuming that the interior is to be maintained not only at or near the pressure, but also at somewhere near the temperature prevailing at the surface of the earth as is very desirable. As the temperature outside of such vessel lowers at increasing depths, the effect on the portions near the outer surface of a thick heavy strong pressure-withstanding vessel wall is to cause such portions near the outer surfaces to tend to contract while the portions of the wall adjacent its inner surfaces are not subjected to such tendency because of the fact that the inner surface of the vessel is maintained at some higher temperature closer to that prevailing at the surface.

The result is that the material of such a vessel wall becomes internally stressed in such a way as to tend to cause very high tension in a tangential direction in the portions near the external surface of the vessel wall and very high compressive stress in the portions near the internal surface thereof. The thicker the vessel wall is made in order to stand greater differentials of pressure, the more acute the problem of internal stresses due to temperature differences becomes and the greater becomes the likelihood of the wall rupturing on its outer surface as well as on its inner surface.

It is an object of this invention therefore to provide a vessel which may have adequate strength for withstanding pressure differentials of such degree as may be desired but which will be relatively free from internal stresses due to the temperature differentials within and without the vessel.

Another object is to provide a vessel of the type above described in which such a vessel made of a given material may be made lighter for withstanding a given pressure differential than could a vessel of similar size and proportions made of the same material but of construction considered conventional in the past.

Another object of this invention is to provide a vessel of the character described in which, if a rupture should occur at any point in the vessel, even though minute in degree, its presence would be immediately observable by an operator of the vessel so as to permit him to take measures to counter the effects of such rupture.

Another object of this invention is to provide a structure for a vessel of the type described, which structure will make it possible for pressure differentials between the interior and exterior of the vessel to be apportioned and proportioned between the more exterior parts and the more interior parts of the wall of such vessel in such distribution as may be considered most desirable.

Another object of this invention is to provide a structure for a vessel of the type described which will make it possible, should a rupture occur, to seal such rupture temporarily against leakage and thereby to give sufficient time for relieving the vessel of its pressure differential.

Another object of this invention is to provide a structure for a vessel of the type described wherein pressure differential stresses are not normally transmitted directly through solid parts of the structure between the more exterior and the more interior portions of the vessel wall structure, but in which upon failure to function of the non-solid normally operative pressure transmitting portion of the structure, the structure will automatically begin to operate with a more conventional solid-to-solid transmission of pressure between interior and exterior parts thereof.

Referring more particularly to the drawings in which is shown by way of illustration and example one embodiment of this invention:

FIG. 1 is a side elevation of the torso and helmet portion of a vessel in the form of a diving suit constructed in accordance with this invention.

FIG. 2 is a top plan of the diving suit illustrated in FIG. 1.

FIG. 5 is a view on a much enlarged scale showing a fragmentary portion of the wall section of FIG. 3 within the circle indicated by the numeral 5 thereof.

FIG. 6 is a view similar to FIG. 5 showing a wall section at a point spaced from that shown in FIG. 5 and illustrating the action of the parts of the structure made in accordance with this invention upon the occurrence of a fracture or a rupture in the outer surface of the vessel.

FIG. 7 is an exemplary fragmentary cross-sectional view of one of the arm or leg extensions adapted for use with the diving suit illustrated in FIGS. 1 to 4, inclusive.

Figure 3:
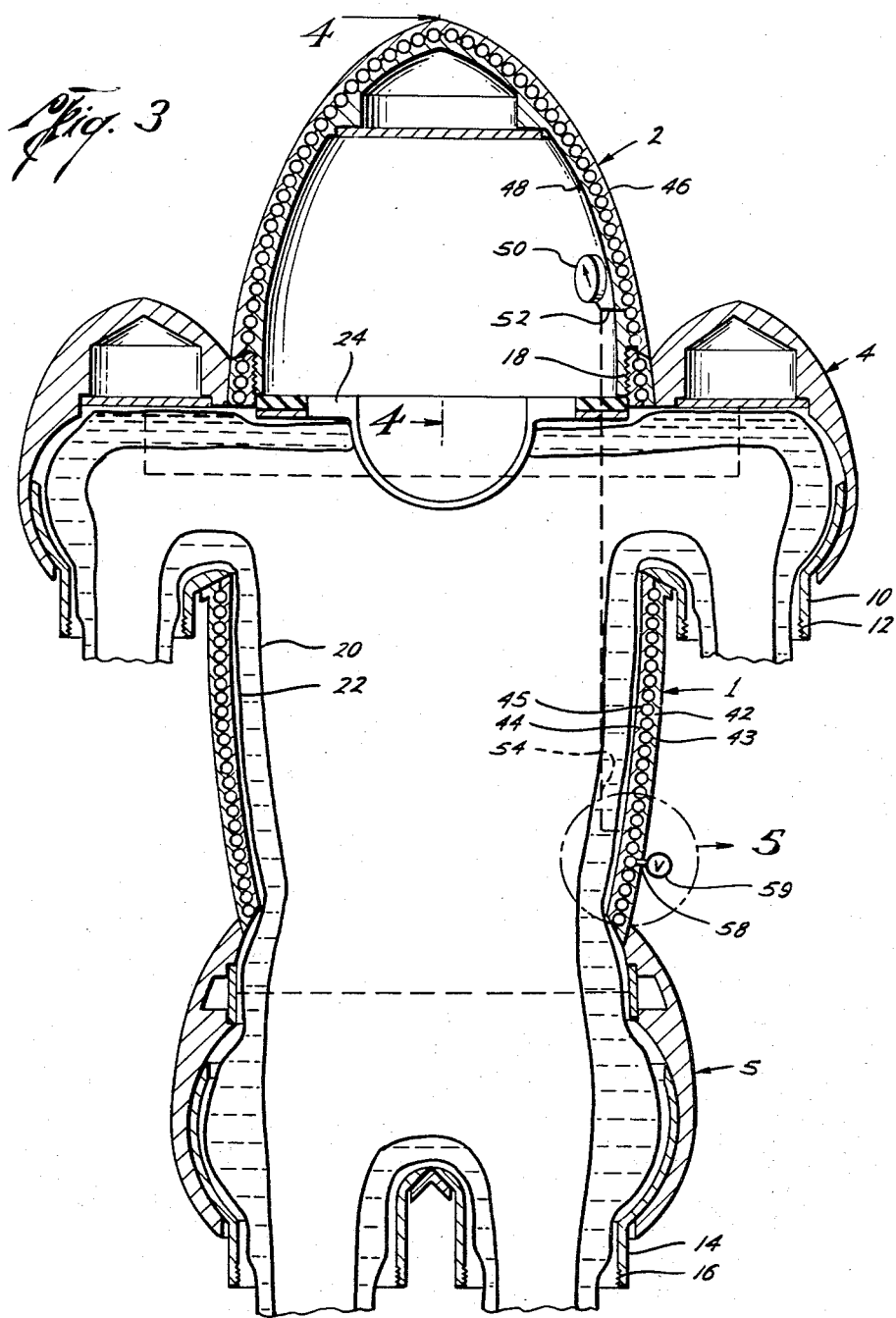
FIG. 3 is a longitudinal cross section through the diving suit illustrated in FIG. 1 taken along the line 3—3 of FIG. 1.

In FIGS. 1, 2 and 3 the main body of the vessel comprising the torso 1 of the diving suit is made substantially oval in longitudinal cross section and, as clearly seen in FIG. 2, substantially circular in horizontal cross section. The circular horizontal cross section prevails in practically all of the parallel horizontal planes that may be passed through the body. Forming the upper part of the body when in use and making up one end portion of the oval shape is the helmet 2 having a window 3 therein through which the diver or other occupant may view the outside surroundings. As will presently be described, the helmet section 2 is removable and serves as a cover for the access opening at the upper end of the torso portion 1. Further, and as will be presently described in more detail, the wall construction of the helmet 2 other than the space covered by the window 3, is of substantially the same form as that of the torso 1.

Although forming no part of the present invention, suitable arm and leg joint mechanisms 4 and 5 are illustrated in FIGS. 1 to 3, inclusive, by which an arm or leg enclosure, which may be of the structure illustrated in FIG. 7 and later to be described, may be secured.

Additional compartments may be mounted on the torso at convenient points such as the compartment 6 which may be employed for housing rebreathing equipment used in rejuvenating the air which may have been breathed by the driver and making it ready for breathing again, and a compartment 7 which may be conveniently mounted to carry a reserve of fluid supply and a control therefor.

As illustrated in FIG. 3, the arm joint structures 4 are provided with extensions 10 internally threaded at 12 to receive the arm structures, and the leg joint portions 5 are provided with extensions or nipples 14 internally threaded at 16 to receive the leg joint portions. The upper inner end portion of the torso, where the helmet section 2 engages the same, may be provided with an internal thread 18 and the helmet 2 provided with a downward threaded extension adapted to threadedly engage the threaded portion 18 so as to secure the helmet 2 in place.

Located inside of the torso and extending into the arm and leg extensions the vessel in the form of the diving suit illustrated may be lined with a suitable and more or less conventional liner which may be in the form of a buoyancy suit having an inner wall 20 and an outer wall 22 with a suitable filler material 23 therebetween. This suit may be of any desired construction suitable for protecting the body of the diver. This buoyancy suit may be supported at its upper end by a ring 24 carried on the upper end of the torso unit 1, this ring surrounding the neck of the diver in use and being appropriately termed a neck ring.

Turning now to FIG. 7, which shows in cross section one of the units for receiving an arm or leg of the diver, such unit is illustrated as formed on its outer upper end with thread 26 adapted to engage the previously mentioned threads 12 or 16 as the case may be to secure the arm or leg unit in place in assembly with the remainder of the suit. Integral with this thread 26 and extending downwardly therefrom is an exterior flexible covering 28, an intermediate space 30 adapted to receive and hold a fluid which is preferably a liquid in accordance with this invention, an interior flexible covering 32 inwardly of the space 30, a second space 34 inwardly of the flexible covering 32, adapted to hold an additional volume of fluid which likewise will preferably be in liquid form, and a plurality of tubular rings 36 within the space 34. Each of the members 28 and 32 heretofore mentioned is annular as are also each of the rings 36 and each of the webs 38 connecting adjacent rings. Likewise, the spaces 30 and 34 are annular, the space 30 being bounded by the flexible coverings 28 and 32 and the space 34 being bounded by the flexible covering 32 and an inner flexible sheath similar to 32 but located inwardly of the rings 36. An additional space may be provided by still another inner liner.

It will be noted that each of the rings 36 is in the form of a torus extending circumferentially within the annular space 34 and each ring spaced from the next ring as illustrated by a flexible web 38.

It will be seen that by the arrangement just described the arm or leg covering will be provided with a liquid body within the space 30 and a second liquid body within the corresponding space between the inner liners of this element, still a third liquid body being located inwardly of the covering 32 and serving to floatingly mount the rings 36 with their interconnecting webs 38. Liquid in this last-named space surrounding the outside of the rings 36 and located between them provides a liquid body which when under pressure will transmit force from the outer liners 28 and 32 inwardly to the inner liners. The rings 36 will be held away from each other and the leg or arm covering extended by the pressure of the fluid located externally of and between the rings. These rings may also be filled with liquid or other fluid for the purpose of enabling them to withstand the external pressure thereon. Preferably these rings are made of stiff strong material so as to sustain the excess of pressure differential on the exterior of the suit against the lower pressure inside the suit, yet the webs 38 interconnecting such rings will be sufficiently flexible to permit the flexing of the arm or leg covering. Pressurizing the liquid bodies in the spaces 30 and 34, besides serving to extend the webs and space the rings further from one another, will serve to transmit pressure from the exterior to the pressure supporting rings and thereby support the outer and inner coverings 28 and 32 more uniformly and rendering less likely any possible rupture thereof due to unequal pressures thereon.

The joint provided by the threads 26 in engagement with the threads 12 or 16, as the case may be, may be further sealed by means of a web 40 that may extend up across such joint and be clamped in place around the outside thereof.

Although not taking full advantage of the arrangement found in the torso of the vessel illustrated and embodying this invention, the structure of the arm and leg units just described does take partial advantage thereof in that it provides an outer and an inner member, one of which (the series of stiff rings 36) is stiff enough to withstand the external pressure differential, and provides a fluid body for transmitting pressure from a more or less flexible exterior member to the more rigid rings and provide more uniform support for the flexible exterior member as well as a more uniform transmission of pressure to the rigid rings. By this means a regulation of the pressure within the fluid body 34 and the fluid body 30 may be employed to regulate the proportion of this pressure which is transmitted through such liquid body to the rings 36.

Turning now to the torso 1, it will be seen that the walls of the torso are made up of an outer shell 42 and an inner shell 44, both of which are preferably of the lightest available material consistent with the strength and rigidity required for withstanding the external excess of pressure over the interior. The outer surface of the outer shell 42 is preferably made smooth as is also the inner surface of the inner shell 44. The inner surface of the outer shell 42 is formed with a series of grooves 43 extending circumferentially of the torso in planes substantially horizontal when the suit is in use and parallel to one another. These grooves are preferably of circular arc cross sections. The inner shell 44 is provided with similar grooves 45 on its outer surface, these preferably being of identical arcuate cross section and spaced substantially similarly to the grooves 43 in the shell 42 so that when the shell 44 is placed within the shell 42 the grooves 43 and 45 will substantially register with one another and when in register with one another will provide substantially circular cross section passageways extending circumferentially of the torso in parallel planes. The torso being circular in cross section in horizontal planes, these grooves will likewise provide substantially circular passageways each of circular cross section and parallel to one another.

The helmet section 2 likewise is made up of an outer shell 46 and an inner shell 48 each circular in cross section in horizontal planes, the outer shell 46 having a series of grooves 47 extending circumferentially in horizontal planes and the inner shell 48 likewise having on its outer surface a series of grooves 49 similar to and facing oppositely to the grooves 47. These are similarly spaced so that when the shells 46 and 48 are placed in the relation illustrated in FIG. 4, the grooves 47 and 49 will register with one another to provide circular passageways in horizontal planes, each passageway being of circular cross section and the circular passageways being each designated by the numeral 51.

Within the passageways provided by the grooves 43 and 45 in the torso and 47 and 49 in the helmet section there is provided in accordance with this invention a body of fluid intended in use to transmit stress due to external pressure differential over the internal pressure from the outer shell to the inner shell. It is to be noted that these two shells are not in contact with one another and that the space between them is such as to permit the outer shell in each case to contract as its temperature lowers and even to move laterally with respect to the other shell if necessary so that no stresses due to the reduction of the exterior temperature as the vessel is lowered into the water will be transmitted to the inner shell. The inner shell will thus remain in substantially its originally unstressed state subject to the imposition on the exterior of the interior shell of a portion of the pressure due to the excess of hydraulic pressure outside of the vessel. The exterior shell likewise will be without distorting stresses due to the temperature changes except as the same may take place to a very limited degree within the relatively thin cross section of this shell. Instead, it will be allowed to assume almost uniformly the temperature of the surrounding water and to contract by virtue of such reduction in temperature without leaving it stressed by the change in temperature. With the shells thus at different temperatures but unstressed to any great degree by the difference in temperatures, the excess of hydraulic pressure on the exterior of the outer shell may be transmitted through a body of fluid between the two shells to the inner shell. The proportion of the total pressure on the exterior which is transmitted to the inner shell will be determined by the pressure of the fluid in the intermediate space. In order to regulate the amount of pressure so transmitted there is first of all provided a pressure gauge 50 having a connecting line 52 to the fluid body space in the helmet and another connecting line 54 to the fluid body space between the two shells in the torso. An operator within the vessel may then regulate the pressure of fluid within the fluid body between the two shells by either injecting more fluid into such body or bleeding some therefrom. In either case he can regulate at will the proportion of external pressure which is sustained by the inner shell and therefore the proportion which is sustained by the outer shell.

Since the two shells do not have to be made thick enough to take the stressing due to changes in temperature as does the ordinary construction of vessels for similar purposes, less stiff material may be used in making up the shells than would be used in making up the single vessel previously regarded as conventional.

It will be understood that while the fluid body is preferably liquid so that only a small volume need be injected or bled off to change the pressure by whatever amount may be desired, it is possible that this body be a gaseous fluid subject only to the provision of a bleed off or injection means of sufficient capacity to handle the required quantities of gas.

Figure 4:
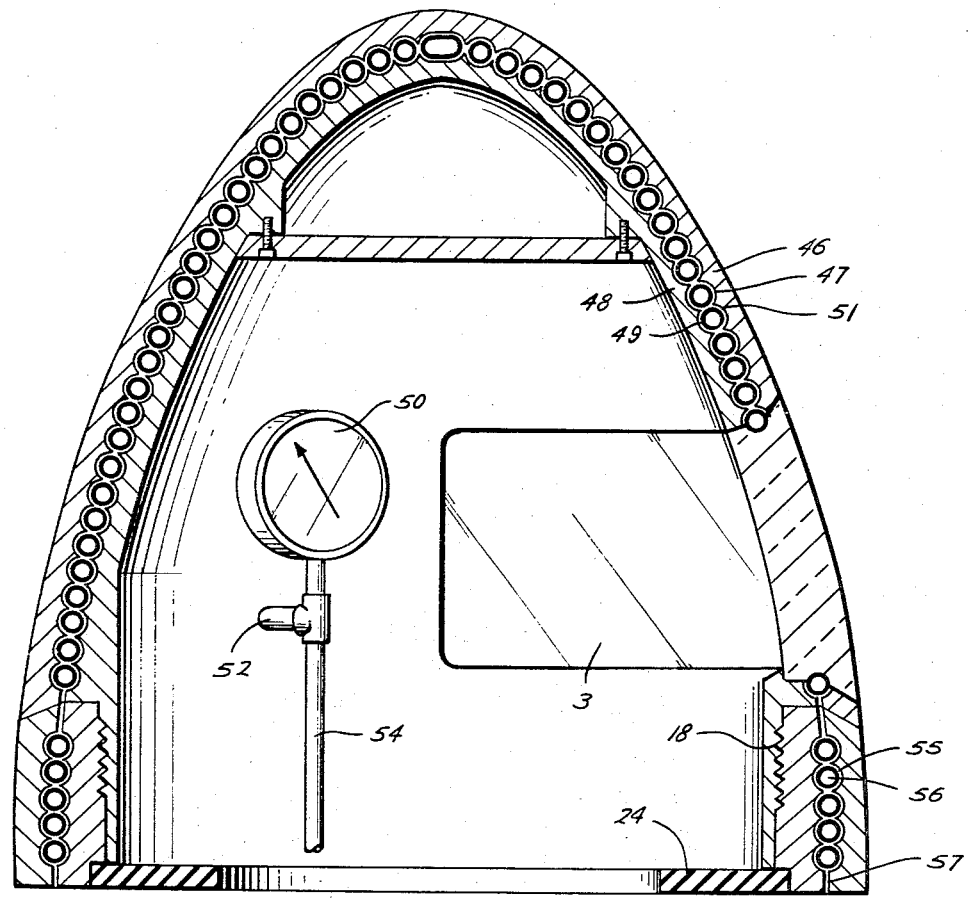
FIG. 4 is a view on an enlarged scale taken at right angles to the sections of FIG. 3 and illustrating a section through the helmet portion of the dividing suit shown in FIGS. 1 to 3, this figure being taken along the line 4—4 of FIG. 3.

In reference to FIG. 4 it will be noted that the fluid space within the circular passageways 51 in the helmet and the corresponding circular passageways in the torso will function as such without more structure than already described and will, as just explained, transmit the external pressure in such proportion as desired from the outer shell to the inner shell. However, it is preferable that the fluid body provided for transmitting pressure between the two shells and permitting motion relatively to prevent the build-up of thermal stresses between the two shells be divided into two parts, each excluded from the other by a flexible wall. In order to accomplish this in the present construction there is provided within each of the circular passageways between the two shells a circular flexible tubular member 55 having a hollow interior 56, this hollow interior providing an additional space within which part of the fluid body transmitting pressure between the shells is located. Outside of the tubular members 55 is the remainder of the tubular body in an annular space within each of the circular passageways, these annular spaces being interconnected in the helmet with those in the torso by means of passageways 57 extending downwardly from the lowermost of the annular spaces within the helmet to interconnect with a similar passageway from the uppermost of such annular spaces within the torso.

As above mentioned, it is contemplated that the operator will bleed off fluid or inject fluid in order to regulate the pressure of the body of fluid between the two shells to proportion the pressure load between the two shells as desired. In order to sense such pressures the pressure gauge 50 has been described as connected to the fluid passageways within the circular passageways previously described. Conveniently, the bleed-offs and injection of fluid for the purpose just stated will be into that portion of the fluid body which is within the flexible tubular members 55, and for this purpose a suitable connection 58 may be made for a valve 59 used in bleeding off or injecting fluid. As illustrated, this bleed-off and injection may be from the exterior of the suit or vessel, or, in the event that the vessel is to be made self sufficient, it may be incorporated in a compartment 7 containing a reservoir of reserve fluid and a control for injecting it or bleeding it off.

With the fluid body thus divided into two parts it will be seen that even if one of the shells should be ruptured and produce a leak, only a portion of the fluid body would be bled off and the remainder of the fluid body would be left intact with the possibilty of pressuring it again for emergency service until repairs could be made.

With reference to FIG. 5 it will be seen that the grooves 43 and 45 provide an annular space 60 therewithin around each of the flexible tubular members 62 within such grooves in the torso, and that within each such ring is a fluid space 64. The circular passageways provided by the grooves 43 and 45 are each separated from adjacent passageways by ribs 66 and 67 on the outer and inner shells, respectively, which ribs project toward each other but in normal position of the two shells are separated from each other as shown at 68 so that each of the passageways containing one of the rings 62 is connected to the adjacent passageways on either side through the openings 68 between the opposed ribs 66 and 67. These ribs serve a dual purpose of separating the passageways in which the rings 62 are located and, in the event of complete failure of the fluid body as just described, the outer shell will be contracted until its ribs 66 engage the ribs 67 on the inner shell, whereupon pressures will be transmitted directly from the outer shell to the inner shell.

Referring to FIG. 6, there is illustrated a situation in which the outer shell may have fractured as shown at 70 so as to permit bleed-off to the exterior of a portion of the fluid body in the annular spaces in the adjacent grooves 43 and 45. It will be seen that under these circumstances the flexible tube 72 which is closest to the fracture 70 will have expanded under the pressure existing within it until it fully engages the walls of the grooves in which it is carried. It is preferred in accordance with this invention that all of the rings 66 are interconnected as shown at 74 so that in effect they provide one body of fluid within them and may all be inflated from one filler tube such as the filler tube 58. However, such interconnections 74 are necessarily relatively small and when the fluid outside of one of the tubes as at 72 is released by a fracture such as 70, the tube 72 will expand into contact with the adjacent walls and will seal off the fracture 70 preventing the escape of fluid from the annular space 60 within grooves 43 and 45 located two or three spaces away from the fracture 70. If necessary to cause this expansion to take place, the operator, having noticed the fracture by noticing a drop in pressure in the pressure gauge 50, may inject additional fluid into the interior of the system of tubes 62. Such injection of fluid should be sufficient to make up for any loss which may have occurred through the fracture 70.

The fracture is shown in the outer shell in FIG. 6 but it is appreciated that it could have taken place within the inner shell and such fractures may occur as a result of many things, usually accidental collisions against external objects causing ruptures in the outer shell and perhaps also in the inner shell.

In the instance illustrated in FIG. 6 it is presumed that the pressure within the annular space 60 will have been greater than that outside of the outer shell. If the opposite were true, then, of course, fluid would come in from outside and place the entire external pressure on the inner shell 44, an undesirable condition, but one which might be partially remedied by the injection of fluid into the tubular members 66 to produce a seal-off as shown in this figure. The presence of such a rupture would not only be shown by a change in the pressure on the pressure gauge 50, but also by a change in the temperature in the fluid body and for the purpose of detecting such changes, is desired, suitable temperature sensing devices might be employed within the fluid body with a read-out available where the occupant of the vessel could see it.

If found necessary in order to place the inner shell within the outer shell, one or both may be made split, or made up of a plurality of components, integrally joined to make the two shells after assembly relative to one another.

From the foregoing it will be seen that this invention is one well adapted to attain all of the ends and objects hereinabove set forth, together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described what is claimed is:

1. A substantially rigid pressure differential sustaining vessel comprising an outer shell and an inner shell having opposed surfaces adjacent but spaced apart throughout their mutual extent but being joined together adjacent their edges to enclose the space between them and at least one of said shells having rigid projections on its surface which is opposed to the other shell and the other of said shells having abutment surfaces directly opposed to and normally slightly spaced from said projections respectively to be engaged thereby upon movement of one shell toward the other, and an exposed surface on each shell facing away from the other shell, said shells, independently of any inflation of the space between them, being each of sufficient inherent rigidity and strength that they are self supporting but of sufficient flexibility so that at points at which said projections and abutment surfaces are normally spaced apart they may flex into contact with each other, and also of sufficient additional inherent strength and rigidity that together they will withstand the expected differential of pressures between the interior and exterior thereof, and a fluid body filling the space between said shells whereby pressure on the exposed surface of one shell may be transmitted through said fluid body to the other shell without flexure of the shells into contact with one another while leaving them free to flex toward and from and shift laterally relative to one another under the influence of differentials of pressure or temperature on their respective exposed surfaces.

2. A vessel as set forth in claim 1 in combination with pressure limiting means for regulating the pressure within said fluid body to limit pressure transmitted from shell to shell therethrough.

3. A vessel as set forth in claim 1 in which said shells on their opposed spaced apart surfaces have such projections and abutment surfaces as alternating similar ribs and similar grooves and said shells in planes parallel to said ribs and grooves are of circular cross section.

4. A vessel as set forth in claim 1 in which said shells on their opposed spaced apart surfaces have such projections and abutment surfaces as alternating similar ribs and similar grooves, each of said ribs on one shell being opposed to a rib on the other shell but normally spaced therefrom by a predetermined distance and adapted to engage said other ribs upon movement of the one shell toward the other shell to positively limit such movement.

5. A vessel as set forth in claim 1 in which said fluid body comprises a hydraulic liquid.

6. A vessel as set forth in claim 1 in which said shells on the opposed spaced apart surfaces have at least part of such projections and surfaces as similar ribs with similar grooves between them, each of said grooves on one shell being opposed to a groove on the other shell and complementary thereto to form therewith a substantially circular passageway separated from the next adjacent similar passageway by the opposed ribs on said shells respectively adjacent said grooves, and communicating with said next adjacent passageway through the space between said opposed ribs.

7. A vessel as set forth in claim 1 in which there is an inflatable flexible member disposed in said fluid body between said rigid projections and having a part of said fluid body therein.

8. A vessel as set forth in claim 1 in which there is an automatic pressure limiting means exposed to and subject to the pressure of said fluid body for regulating fluid pressure of said fluid body whereby changes in dimension of either shell relative to the other shell due to unequal changes in fluid pressure or temperature on the exposed surfaces of said shells will be permitted by said fluid body while the strain produced in the other shell by such relative changes in dimension may be controlled to a desired limit.

9. A vessel as set forth in claim 8 in which said shells are curved in cross section substantially throughout their extent and are of circular cross section within one series of parallel planes throughout the major portion of the extent of the vessel in a direction normal to such planes.

10. A vessel as set forth in claim 9 in which said shells, on their opposed surfaces, within the portion of circular cross section in parallel planes, have at least part of such projections and abutment surfaces as similar ribs with similar grooves between them and in which the ribs opposed to each other on said shells respectively are normally spaced from one another and said grooves which are opposed to one another on said shells respectively are complementary and provide spaces of substantially circular cross section.

11. A vessel as set forth in claim 8 in combination with an inflatable flexible member disposed in said fluid body between said shells and having a part of said fluid body therein, and means for regulating comprises means for injecting fluid into and bleeding fluid off from said flexible member to regulate pressure within said fluid body.

12. A closed vessel suitable for use as a diving vessel beneath the surface of a body of water or the like comprising an outer shell and an inner shell, said shells being curved throughout in cross section and being in cross section circular in parallel planes within at least a substantial zone thereof and having opposed surfaces spaced apart substantially throughout their mutual extent and an exposed surface on each shell facing away from the other shell with said exposed surfaces approximately equidistant from each other throughout the cross section of the shell within each of said planes, said shells on their opposed spaced apart surfaces having alternating similar ribs and similar grooves, each of said grooves on one shell being opposed to a groove on the other shell and complementary thereto to form therewith a substantially circular passageway separated from the next adjacent similar passageway by the opposed ribs on said shells respectively adjacent said grooves and communicating with said next adjacent passageway through the space between said opposed ribs, a fluid body filling the space between said shells, and an inflatable flexible member in said fluid body between said shells having a portion of said fluid body within said member, said member comprising a tubular portion in each of a plurality of said circular passageways and means interconnecting said tubular portions so that the fluid within said flexible member will be continuous from one tubular portion to the next, and means for injecting fluid into and bleeding it off from said flexible member to regulate pressure within said fluid body.

13. A vessel as set forth in claim 12 in combination with pressure sensing means for sensing the pressure within said fluid body and conveying the same to an operator continuously whereby said operator may regulate the pressure in said fluid body in response to any change detected by said pressure sensing means.

14. A vessel as set forth in claim 13 in combination with means for continuously sensing the temperature within said fluid body and conveying the same to an operator.

15. A vessel comprising an outer shell and an inner shell, said shells being curved throughout in cross section in parallel planes within at least a substantial zone thereof and having opposed surfaces spaced apart substantially throughout their mutual extent and an exposed surface on each shell facing away from the other shell with said exposed surfaces approximately equidistant from each other throughout its cross section within each of said planes, a fluid body filling the space between said shells, an inflatable flexible member disposed in said fluid body between said shells and having a part of said fluid body therein, and being of a normal inflated dimension to be disposed between said shells without bearing contact directly against either shell but being subject to expansion under excessive inflation sufficient to bear against both shells, and means for injecting fluid into and bleeding fluid off from said flexible member to regulate pressure within said fluid body, whereby changes in dimension of either shell relative to the other shell due to unequal changes in fluid pressure or temperature on the exposed surfaces of said shells will be permitted by said fluid body while the strain produced in the other shell by such relative changes in dimension may be controlled to a desired limit.

References Cited

UNITED STATES PATENTS

| | | | |
|---|---|---|---|
| 1,226,148 | 5/1917 | Walters | 2—2.1 X |
| 1,430,194 | 9/1922 | Schweinert | 61—71 X |
| 1,879,735 | 9/1932 | D'Albay. | |
| 2,084,236 | 6/1937 | Babb. | |
| 3,044,515 | 7/1962 | Eades. | |
| 3,167,204 | 1/1965 | Rouse | 114—16 X |
| 3,261,317 | 7/1966 | Gignoux | 114—16 |

FOREIGN PATENTS 857,499   12/1960   Great Britain.

MILTON BUCHLER, *Primary Examiner.*

T. M. BLIX, *Assistant Examiner.*